Nov. 26, 1935.　　　F. M. SLOUGH　　　2,022,440
TEMPERATURE INDICATOR
Filed Nov. 30, 1928
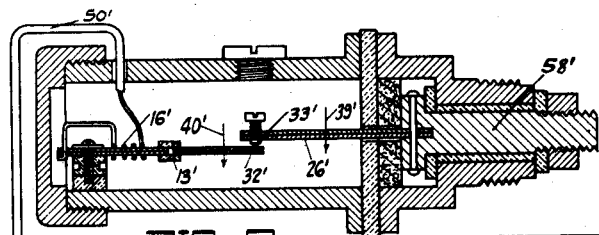
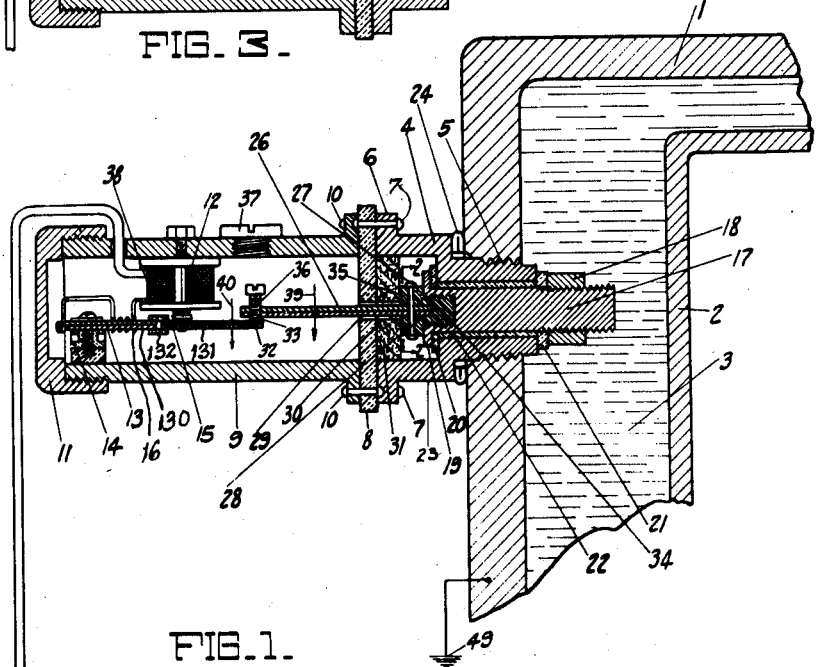
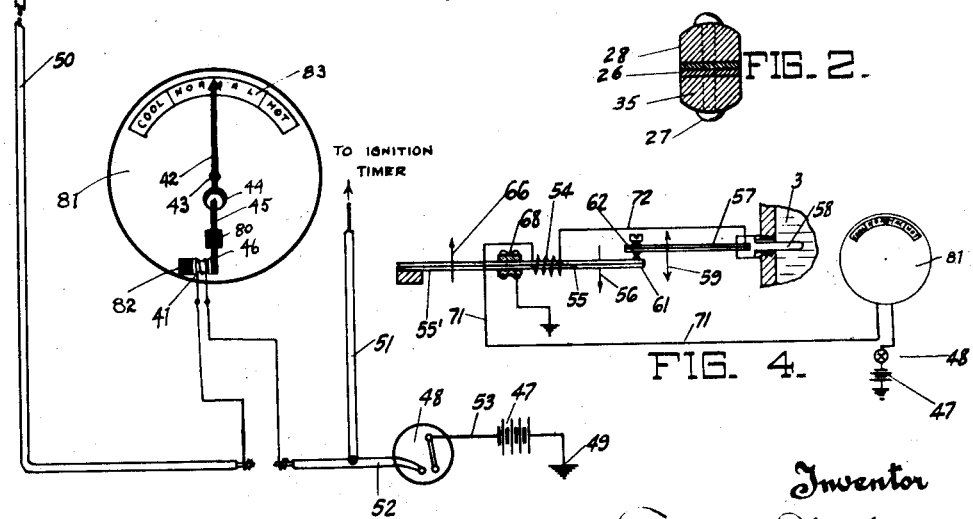
Inventor
Frank M. Slough.

Patented Nov. 26, 1935

2,022,440

UNITED STATES PATENT OFFICE 2,022,440

TEMPERATURE INDICATOR

Frank M. Slough, Cleveland, Ohio, assignor to The Anderson Company

Application November 30, 1928, Serial No. 322,905

4 Claims. (Cl. 177—351)

My invention relates to thermal indicators and relates particularly to thermal indicators of the type wherein temperature conditions existing at one point may be indicated at a point disposed remotely thereto.

More particularly my invention relates to an indicating mechanism adapted to indicate on an instrument board of a motor vehicle, the temperature of the cooling fluid for the engine for the vehicle.

An object of my invention is to reliably indicate temperature remotely from the point where the temperature condition to be indicated exists.

Another object of my invention is to provide a remotely disposed indicating mechanism for indicating temperatures and/or pressures comprising separate operating and indicating units, the operating unit exercising control over the indicating unit, by virtue of an electrical circuit interlinking the two.

Another object of my invention is to provide mechanism of the above type which will be reliable in use and which can be manufactured at low cost.

Other objects of my invention and the invention itself will become apparent by reference to the following description of several embodiments of my invention, which are illustrated in the accompanying drawing.

Referring to the drawing:

Fig. 1 illustrates a system comprising a controlling unit and an indicating unit applicable to an automotive vehicle to remotely indicate the temperature of the engine cooling fluid, together with associated electrical circuit conductors, a controlling switch, and a source of current; the view of the controlling apparatus and a fragment of the engine cooling jacket is shown mostly in longitudinal section, and other parts being illustrated diagrammatically.

Fig. 2 is a section taken on the line 2—2 of Fig. 1.

Fig. 3 is a sectional view of an alternate embodiment controlling unit for the system of Fig. 1.

Fig. 4 illustrates a system which is another embodiment of my invention, the view being diagrammatic.

Referring now first to the embodiment of my invention illustrated in Fig. 1, at 1 and 2 I show outer and inner walls of an automotive engine motor block normally containing between them flowing cooling fluid, such as water, indicated at 3. At 4 I show a tubular supporting shell, screw threaded, by a threaded reduced end 5, into an aperture of the wall 1, and supporting by its outwardly extending rim flange 6, an apertured disk 8 of heat insulating, heat resisting material, such as asbestos board secured thereto by spaced rivets 7.

A flanged tubular casing 9 is securely mounted on the disk 8 by rivets 10 projected through its flange and disk. A cap 11 is screw threaded onto the end of the casing 9. On the interior of the casing, an electromagnet 12 and a thermostatic warpable strip 13 are carried, the latter being carried by an end, while thermally insulated from the casing 9, on a supporting block 14 of heat and electrical insulating material secured to the inner wall of the casing. The strip 13 carries an armature 15 for an electromagnet 12, the armature being spaced from the adjacent pole of the magnet core, and an electrical heating element 16 comprising a few convolutions of resistance wire, is placed closely about a limited length of the strip 13, preferably near its support 14.

Within the supporting shell 4, a metallic plug 17 is disposed having an end projected between the jacket walls 1 and 2, and immersed in the cooling fluid 3. The plug 17 is provided with external threads on its immersed projecting end, on which a clamp nut 18 is threaded to cooperate with the flanged head 19 of the plug to securely clamp the plug in position on the shell 4.

Suitable interposed heat insulating washers 20 and 21 and a heat insulating bushing 22 restricts the flow of heat from the metallic walls of the shell 4 to the plug 17, while the end of the plug and the carried clamping nut 18 collects heat from the surrounding fluid 3.

The plug 17 and the nut 18 are preferably of copper or other efficient heat conducting material while the shell 4 and casing 9 together with the cap 11 are preferably of soft steel, and the outer surface 23 of the shell 4 is preferably made polygonal to facilitate screw threading it into the engine jacket wall 1. A fluid sealing gasket 24 is interposed between a shoulder of the shell and the wall 1.

A heat conducting metallic holder 28 having a threaded stem 34 and an enlarged bifurcated head 35, is screw threaded by its stem into an end recess of the plug 17.

An end of a bi-metallic thermally warpable strip 26 is rigidly secured between the forks of the head 35, by one or more rivets 27 passed therethrough and through the strip. The free end of the strip 26 extends longitudinally from the shell 4 into the tubular casing 9, through aligned elongated apertures 29 and 30 of the heat insulating disks 8 and 31, the latter disk being interposed between the disk 8 and the strip holder 25. The free ends of the strips 13 and 26 are juxtaposed and each carries a contact element made of platinum, silver, or the like, as illustrated at 32 and 33 respectively. During operation of the controlling unit, these contacts are intermittently moved to current conducting engagement as will be later, herein, related.

One of the contacts, such as the contact 33, is preferably mounted on the end of an adjusting screw 36, whereby the contacts 32 and 33 may be relatively adjusted, access to the screw 36 for adjustment being had through the wall of the casing 9 by first removing a closure plug 37, normally screw threaded into the wall.

The electromagnet 12 preferably comprises a winding 38 of a relatively few number of turns of wire, when the winding is placed in serial circuit with the heating element 16, as illustrated. Circuit conductors such as the conductor 50, will extend between the controller and the indicator, shown in the top portion and lower portion, respectively, of Fig. 1. Other circuit conductors such as the conductor 51 leading to the ignition circuit 52, and ignition switch 48, and 53 leading to the storage battery 47, will be well understood.

However, the magnet winding 38 may be placed in multiple circuit with the winding 17 instead of serial circuit, and the number of turns in the wire 38 will be accordingly modified in such a case, so as to limit the energization of the magnet and the diverting of current from the heating element 16. Bi-metallic strips 26 and 13, when exposed to heat, are each adapted to move in the same direction, indicated by the arrows 39 and 40 on the drawing of Fig. 1.

Although the precise form of the indicating instrument may be widely varied, the indicator shown at 81 comprises a pointer 42 pivoted at 43 and having a short bifurcated end 44, its other pointing end adapted to traverse a scale which may be graduated to degrees of temperature, or as in the scale illustrated at 83, may merely contain legends such as Cool, Normal and Hot.

The actuating means for the pointer 42 comprises a bi-metallic thermally warpable strip 46 supported by a fixed end and carrying by its free end a compensating bi-metallic thermally warpable strip 45 which projects between the forks of the pointer portion 44. The actuating and compensating strip sections 46 and 45 respectively, are preferably thermally insulated from each other by the joining pieces 80 of preferably heat insulating material, the pieces being riveted or otherwise secured to the strips at their adjacent ends.

Although the heating element 41 may comprise merely a few turns of resistance wire winding on the strip 46 after the manner of the resistance wire 16 on the strip 13 of the controller apparatus, I may sometimes provide a metallic spool 41 rigidly carried on a block of insulating material 82, which in turn is carried by the frame of the indicating instrument, and by riveting or otherwise the fixed end of the strip 46 is carried on an end of the spool 41.

The spool 41 carries the few turns of resistance wire for heating it and the heat from the spool is communicated through its head directly to the strip 46 to electrically heat it in order that the strip 46 may be warped commensurably with the amount of heat communicated from the spool over a period of time.

The spool 41 may be of copper or brass and be of such mass as to provide ample heat storage capacity whereby when electrical current flows intermittently through the resistance winding placed on the spool under the control of the electrical contacts 32—33, the heat received during each current impulse will be largely storage and continuously supplied to the strip 46.

The strips 45 and 46 are oppositely disposed relative to the disposition of their bi-metallic laminated components, such as brass and steel, placed face to face throughout their lengths, so that upon both strips being heated they will warp their ends in opposite directions.

The compensating strip 45 is made of such a length and of such a thickness that when both strips are alike subjected to the same atmospheric temperature, the opposite warping effects of the two will substantially exactly counter-balance, and the free end of the strip 45 will not effect movement of the bifurcated end of the pointer.

However, electrical heating is only communicated to the strip 46 and it will alone warp when electrically heated, moving the free end of the strip 45.

The storage battery 47, for the automotive vehicle, supplies the electrical current for the system through contacts of the ignition switch 48, which is used to control the flow of current from the storage battery to the ignition circuit and to the temperature indicating system circuit.

At 49 the frame of the automobile chassis is indicated, diagrammatically. One of the rivets, such as the rivet 7' of the group of rivets 7 and 10 joining the controller shell 4 and the tubular casing 9 to the intermediate heat insulating disk 8, will be understood as electrically connecting the casing 9 to the shell 4, which in turn makes electrical connection to the chassis, indicated diagrammatically at 49, Fig. 1.

The parts being arranged as described, the system of Fig. 1 operates as follows, it being considered, e. g., that the cooling water 3 has attained a temperature of 160° Fahrenheit, and responsive to such a temperature, heat communicated to the bi-metallic strip 26 via the plug 17 and clamping nut 18 and the bifurcated metallic holder 25, causes the strip to warp in the direction of the arrow 39, to effect contact between the normally separated electrical contacts 32 and 33 carried on the ends of the juxtaposed strips 13 and 26, and contacts of the ignition switch 48 being meanwhile closed during operation of the engine.

It will be assumed, moreover, that these contacts will be closed when the temperature communicated to the strip 26, reaches 120°, which is arbitrarily selected as being a temperature in excess of atmospheric temperature. Closure of the contacts will effect energization of the heating elements 16 and 41, and also the electromagnet 12. The only effect of the electromagnet 12, will be to deflect the strip 13, against the power of its inherent resiliency, to more firmly press the contacts 32 and 33 together, though, as will be later understood, the magnet 12 is made to exercise insufficient magnetic force to cause more than a slight deflection of the strip 13.

Closure of the contacts being more firmly maintained, first by the intensifying pressure effect caused by energization of the magnet, and second by the continued warping of the strip 26 by the increased temperature gradually being acquired by the fixed end of the bi-metallic strip 26, heating of the strip 13 by the heating element 16 adjacent the fixed end of the strip 13 will continue simultaneously with heating of the heating element 41 to effect, in the latter case, movement of the pointer 41 over the scale 82 to indicate the temperature.

Finally, depending upon the amount of warping meanwhile effected by the strip 26, responsive to the temperature of the fluid 3, and depending upon the rate and intensity of heat effected by the heating element 16 upon the bi-metallic strip 13, the strip 13 will warp its contact carrying end in the direction of the arrow 40, and against the power of the pressure intensifying magnet 12, until the contact 32 is withdrawn from the contact 33, whereupon the contacts being initially broken, they will separate a predetermined distance by a "snap-action", by virtue of the inherent resiliency of the strip 13 and the slight deflection effected upon the strip 13 by the magnet 12, until the contacts are broken.

This will produce a "quick break" of the contacts to materially reduce the "arcing" at the contacts and will materially increase their period of usefulness.

The contacts being thus broken, heating of the strip 13 by the heating element placed thereupon, will be discontinued and heat being lost therefrom, from all causes such as radiation, convection, and conduction, the thermostatic strip 13 will unwarp sufficiently to reclose the contacts 32—33, whereupon the operation just described will be periodically reeffected.

The heat storage capacity of the heating element 41 and the strip 46, will be made such that upon momentarily reduced temperatures the indicating pointer will only slightly recede. At the same time, the parts will preferably be so proportioned that heat indications responsive to the first few of a series of periodic energizations of the heating element 41 will, in a reasonably limited length of time, effect warping of the strip 46 to cause the pointer 42 to advance over the scale to indicate the temperature of the exciting liquid 3. The parts will preferably be so proportioned, for most purposes, as to make this period of about one-half minute duration.

The position of the pointer on the scale for any given motor temperature, may be varied by longitudinally adjusting the contact carrying screw 36 by turning it in the threaded aperture of the strip 26, through which it is passed, to determine, first, the temperature at which the contacts 32 and 33 engage, and second, the higher temperature at which these contacts are broken.

Of course during the operation of the device, the indications will slightly vary, periodically, but because of the effect of heat storage just described, this variation is slight and not readily noticeable.

The strip 13 preferably comprises two longitudinally disposed sections 130 and 131 joined at adjacent ends preferably by junction means 132 of relatively non-heat conducting material. The heating element 16 is disposed on one of the sections such as the section 130 which is so disposed relative to the strip 26 attached to the immersion plug 17 that it will warp the contact carrying end of the strip 130—131 in such direction as indicated by the arrow 40, which corresponds to the direction of warping indicated by the arrow 39 for the strip 26 when heated. The section 131 however, if heated, will warp in the direction opposite to that indicated by the arrow 40.

I find that the heating of the section 130 of the element 16 may be accomplished without objectionable heating of the section 131 whereas temperature changes of the sections 130 and 131, due to atmospheric or ambient temperatures will affect both equally.

The sections 130 and 131 are so predetermined as to length and thermal responsiveness that the carried contact 32 will remain immovable upon changes of temperature of both sections 130 and 131 resulting from changes of ambient temperature only and will move upon a change of temperature effected by energization or de-energization of the heating element 16.

Having described completely one embodiment of my invention, reference will now be had to other embodiments, such as shown in Fig. 3, wherein a controller is illustrated, which is substantially the same as the controller of the system of Fig. 1, except that in this embodiment no electromagnet is employed, and the heating element 16' for the strip 13' is included in serial circuit with the circuit conductor 50', leading to the heating elements, such as 41, as illustrated in Fig. 1, the other parts of the system being preferably the same as in Fig. 1.

The operation of the controller of Fig. 3, is, in the main, like that of Fig. 1, except that the same degree of "snap-action" breaking of the electrical contacts 32' and 33', will not be had in the embodiment of Fig. 3, which, however, is less expensive to make than the preceding embodiment.

The controlling unit indicated in Fig. 4 is generally the same as that of Fig. 3 except that the electrical heating element 54 is associated with the contact carrying section 55 of the bi-metallic strip rather than with the fixed section 55'.

Therefore, in the system of Fig. 4, upon changes of atmospheric temperature, the strip 55, carrying a heating element 54 is thermally insulated from and warps in an opposite direction to the supporting strip 55', a heat insulating connector 68 holding the spaced ends of the strips together.

It will be understood that upon increases of atmospheric temperature, the strip 55' will warp its free end in the direction indicated by the arrow 66 while the strip 55 will warp its free end in the direction indicated by the arrow 56. The net result of atmospheric heating, therefore, would be, assuming the parts to be properly proportioned, to tend to maintain the contact 61 carried at the end of the strip 55, in the same position.

However, the strip 57 would also be warped in the direction indicated by the arrow 59, which would increase the pressure of contact between the contacts 61—62. The contacts would be subsequently separated as described for the embodiment of Fig. 3, by electrical heating of the strip 55 moving its free end downwardly in the direction of the arrow 56.

The plug 58 supporting the strip 57, communicates heat to it from the liquid 3. The circuit arrangements in the embodiments of Fig. 4 and Fig. 3 are identical, and except for the inclusion of the magnet winding 38 in the system of Fig. 1, the circuit of Fig. 1 is also preferably like that of the other figures.

It will be understood also that any of the thermostatic strips of controller or indicator may be arranged in other form, such as by coiling or bending, or other forms of thermally movable elements may be substituted, those shown being considered, however, most suitable for the purposes indicated herein.

Having thus described my invention as applied to several embodiment controllers and indicators operating in two different ways in connection with the different controllers, I am aware that numerous and extensive departures may be made from the controlling and indicating mechanisms and systems as above described, but without departing from the spirit of my invention, and that controllers and/or indicators, varying widely in specific design from those herein shown may be substituted therefor.

Also that such may be used in connection with the indicator and/or controller of any of said embodiments illustrated herein, or within the purview of my invention, but without departing from the spirit of my invention.

I claim:

1. An electrical controlling mechanism for a temperature indicating system comprising a two-part casing, thermal insulating means joining the casing parts, one of said parts terminating in a heat conducting plug adapted for projection through an aperture of a fluid container for exposure to the temperature of fluid therein, the other casing part supplying a thermostat chamber, a pair of bimetallic thermostats and an electrical controller in the thermostat chamber, differentially operable by said thermostats, one of said thermostats extending by a heat conducting end through said insulating means into the other said casing part and thermally joined therein to said plug and responsive to plug temperature, and an electrical resistor heater thermally associated with the other of said thermostats.

2. An electrical controlling mechanism for a temperature indicating system comprising a two-part casing, thermal insulating means joining the casing parts, one of said parts terminating in a heat conducting plug adapted for projection through an aperture of a fluid container for exposure to the temperature of the fluid therein, the other casing part supplying a thermostat chamber, a pair of bimetallic thermostats, an electrical current controller therein differentially operable by said thermostats comprising engageable contacts supported by the respective bimetallic thermostats, one of said thermostats extending by a heat conducting end through said insulating means into the other casing part and thermally joined therein to said plug and responsive to plug temperature, an electrical resistor heater, thermally associated with the other of said thermostats, energizable by current passing therethrough to heat its associated thermostat effecting a separation of the contacts.

3. An electric controller mechanism comprising a two-part casing having relatively thermally insulated casing parts, one of said parts including a heat conducting plug adapted for projection through an aperture of a fluid container and exposed to the temperature of fluid therein, the other part comprising a thermostat chamber, a first thermostat thermally joined to the plug and responsive to plug temperature, and a second electrically heatable thermostat disposed in the chamber and adapted upon engagement with the first thermostat to complete an electric circuit.

4. An electrical controlling mechanism for a temperature indicating system comprising a two-part casing, thermal insulating means joining the casing parts, one of said parts terminating in a heat conducting plug adapted for projection through an aperture of a fluid container for exposure to the temperature of fluid therein, the other casing part supplying a thermostat chamber, a pair of bimetallic thermostats, an electrical current controller therein, differentially operable by said thermostats, one of said thermostats extending by a heat conducting end through said insulating means into the other casing part and thermally joined therein to said plug and responsive to plug temperature, the other of said thermostats being compensated for ambient temperature and adapted upon contact with the first said thermostat to complete an electric circuit.

FRANK M. SLOUGH.